(12) United States Patent
Piech et al.

(10) Patent No.: US 11,904,196 B2
(45) Date of Patent: Feb. 20, 2024

(54) MAGNETIC TRAP SUPPRESSION TANK LEVEL SENSOR

(71) Applicant: Carrier Corporation, Palm Beach Gardens, FL (US)

(72) Inventors: Marcin Piech, East Hampton, CT (US); Cezary Jedryczka, Lniano (PL); Wojciech Szelag, Poznan (PL); Rafal Wojciechowski, Szamotuly (PL); Tadeusz Pawel Witczak, Farmington, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 204 days.

(21) Appl. No.: 17/254,335

(22) PCT Filed: Oct. 2, 2019

(86) PCT No.: PCT/US2019/054223
§ 371 (c)(1),
(2) Date: Dec. 21, 2020

(87) PCT Pub. No.: WO2020/112241
PCT Pub. Date: Jun. 4, 2020

(65) Prior Publication Data
US 2021/0275850 A1 Sep. 9, 2021

Related U.S. Application Data

(60) Provisional application No. 62/773,272, filed on Nov. 30, 2018.

(51) Int. Cl.
*A62C 37/50* (2006.01)
*A62C 35/02* (2006.01)
*G01F 23/72* (2006.01)

(52) U.S. Cl.
CPC ............ *A62C 37/50* (2013.01); *A62C 35/023* (2013.01); *G01F 23/72* (2013.01)

(58) Field of Classification Search
CPC .......... G01F 23/76; G01F 23/66; G01F 23/68; G01F 23/62; G01F 23/72; A62C 35/02; A62C 35/023; A62C 37/50
See application file for complete search history.

(56) References Cited

U.S. PATENT DOCUMENTS 3,572,122 A 3/1971 Nusbaum
4,056,979 A 11/1977 Bongort et al.
(Continued)

FOREIGN PATENT DOCUMENTS

CH 696230 A5 2/2007
CN 201589644 U 9/2010
(Continued)

OTHER PUBLICATIONS

Jon Wilson, "A Practical Approach to Vibration Detection and Measurement Part 1: Physical Principles and Detection Techniques", Sensors/Online, Feb. 1, 1999, Questex, Newton, Massachusetts, retrieved from https://www.sensorsmag.com/components/a-practical-approach-to-vibration-detection-and-measurement-part-1-physical-principles on Feb. 13, 2018.
(Continued)

*Primary Examiner* — Christopher R Dandridge
(74) *Attorney, Agent, or Firm* — Bachman & LaPointe, P.C.

(57) ABSTRACT

A fire suppressant storage device (20) comprises: a tank (22) having a first port (40), a second port (70), and an interior (32) for storing fire suppressant. A discharge assembly (46) is mounted to the first port and comprises a discharge valve (48) and a charge conduit (50) at least partially within the interior. The discharge conduit has an interior and an exte-
(Continued)

rior. A liquid level measurement assembly (82; 200; 250; 300; 400) is mounted to the second port and comprises: a tube (100) at least partially within the tank interior and having an interior sealed relative to the surrounding tank interior and an exterior; a float (120; 220) surrounding the tube; and a member (122; 222; 252; 302) axially movable within the tube interior. One of the float and the member comprises an upper magnet (130; 230) and a lower magnet (132; 232). The other of the float and the member magnetically cooperates with the upper magnet and the lower magnet to relatively axially trap the member to the float.

20 Claims, 10 Drawing Sheets

(56) References Cited

U.S. PATENT DOCUMENTS

| | | | | |
|---|---|---|---|---|
| 4,384,486 | A | * | 5/1983 | Eckert ............... A62C 37/50 |
| | | | | 73/321 |
| 4,466,284 | A | | 8/1984 | Dumery |
| 4,730,491 | A | | 3/1988 | Lew |
| 5,054,318 | A | | 10/1991 | Lew |
| 5,054,319 | A | | 10/1991 | Fling |
| 5,636,548 | A | | 6/1997 | Dunn et al. |
| 6,131,667 | A | * | 10/2000 | Jesadanont ............ A62C 13/76 |
| | | | | 169/56 |
| 6,253,611 | B1 | | 7/2001 | Varga et al. |
| 6,481,278 | B1 | | 11/2002 | Kaylor et al. |
| 6,910,378 | B2 | | 6/2005 | Arndt |
| 9,435,680 | B2 | | 9/2016 | Klein |
| 9,664,553 | B1 | | 5/2017 | Smith |
| 2015/0068301 | A1 | * | 3/2015 | Ross, Jr. ............... G01F 23/04 |
| | | | | 73/313 |

| | | |
|---|---|---|
| 2015/0355014 | A1 | 12/2015 Deak et al. |
| 2017/0074714 | A1 | 3/2017 Aschenbrenner |
| 2017/0074715 | A1 | 3/2017 Bartos et al. |
| 2017/0315238 | A1 | 11/2017 Nagai |

FOREIGN PATENT DOCUMENTS

| | | | | |
|---|---|---|---|---|
| CN | 202453039 | U | 9/2012 | |
| CN | 103837211 | A | 6/2014 | |
| CN | 204563401 | U | 8/2015 | |
| CN | 105675092 | A | 6/2016 | |
| CN | 205373827 | U | 7/2016 | |
| CN | 106092273 | A | 11/2016 | |
| DE | 2342735 | * | 2/1975 | ............ G01F 23/62 |
| DE | 2342735 | A1 | 2/1975 | |
| WO | 2006/091107 | A1 | 8/2006 | |
| WO | 2017139960 | A1 | 8/2017 | |

OTHER PUBLICATIONS

Chris Waltham et al., "A Versatile Sensor for String Motion", May 23, 2006, Department of Physics and Astronomy, University of British Columbia, Vancouver BC, Canada.

Frank J. Smith, "Continuous Level Float Sensors", Feb. 16, 2012, Madison Company, Branford, Connecticut.

"Inductive Sensor M30 Long Housing", Oct. 17, 2012, Multicomp, New South Wales, Australia.

"VL53LOX Time-of-Flight Distance Sensor Carrier with Voltage Regulator, 200cm Max", Solarbotics Ltd., Calgary, Alberta, Canada, retrieved from https://solarbotics.com/products/51111/ on Feb. 25, 2018.

International Search Report and Written Opinion dated Dec. 18, 2019 for PCT/US2019/054223.

Chinese Office Action dated Dec. 11, 2023 for Chinese Patent Application No. 201980041008.3.

* cited by examiner

MAGNETIC TRAP SUPPRESSION TANK LEVEL SENSOR

CROSS-REFERENCE TO RELATED APPLICATION

Benefit is claimed of U.S. Patent Application No. 62/773,272, filed Nov. 30, 2018, and entitled "Magnetic Trap Suppression Tank Level Sensor", the disclosure of which is incorporated by reference herein in its entirety as if set forth at length.

BACKGROUND

Liquid fire suppression agents have been used for decades. Although some agents such as hydrofluorocarbon (HFC) (e.g. Halon 1301 (bromotrifluoromethane) and HFC-227ea (heptafluoropropane)) are in disfavor due to environmental concerns, replacements are readily commercially available, such as a fluoroketone formulated as dodecafluoro-2-methylpentan-3-one (1,1,1,2,2,4,5,5,5-nonafluoro-4-(trifluoromethyl)-3-pentanone) $(CF_3CF_2C(O)CF(CF_3)_2)$ (ASHRAE nomenclature FK-5-1-12). Such agents are typically used with a pressurant/propellant such as nitrogen $(N_2)$. Kidde-Fenwal, Inc. of Ashland, Mass. manufactures an exemplary fire suppression system, the Kidde® ADS™ Other suppressant agents and pressurants/propellants may be used in fire suppression systems as necessary to meet desired fire suppression capabilities.

Typically such agents are stored as a liquid in one or more metal tanks (e.g., steel tanks having a cylindrical centerbody and domed ends, although other shapes and materials are also known in the art). A tank is typically positioned with its axis vertical so that one end is an upper end or top and the other a lower end or base. The upper end typically has a number of ports with fittings (e.g., threaded fittings). Typically a large center port receives a discharge assembly. The discharge assembly may include a fitting portion mated to the tank fitting and an external valve (e.g., automatically controllable via a control system). A discharge conduit (also known as a siphon tube or dip tube) extends downward into the tank and typically has an open lower end near the bottom of the tank. In facility configurations requiring multiple tanks, the tanks may be connected to a suppression system serially, independently, or in distributed locations in different configurations, and may be co-located or distributed throughout a facility. The suppression system includes piping from the tank(s) to endpoints such as discharge nozzles. Various pressure regulators and controllable valves may be located along the piping to provide selective discharge of suppressants at locations of fire.

Due to their low heat of evaporation and high vapor pressure (e.g., relative to water), typical liquid fire suppression agents will rapidly vaporize at discharge from the nozzle outlets and thus be delivered as vapor.

If the discharge valve is opened, pressure in the tank headspace (e.g., from the pressurant/propellant noted above) is sufficient to drive liquid suppressant up through the discharge conduit and out of the tank. Pre-use, the surface level of liquid in the tank will typically be well into the upper half of the tank. The exact position will depend on factors including the nature of the suppressant, the nature of the pressurant/propellant (e.g. composition and whether internally or externally located), and the application.

It is necessary to at least occasionally measure the fluid level in the tank (e.g., safety regulations typically require semi-annual inspection including verification of agent amount). To do this without venting the tank, several liquid level measurement systems have been proposed. A number of these systems make use of an additional vertically-extending conduit mounted to an additional port in the tank upper end. Typically, the tanks may be provided with multiple smaller off-center ports (e.g., with internally threaded fittings) in addition to the center port. These ports may serve for various functions. An exemplary such liquid level sensing system has a fitting mounted to one of those additional port fittings with a conduit (e.g., metal tube) extending vertically down toward the base of the tank. Unlike the discharge conduit, the lower end of this liquid level sensing tube is closed so that the interior of the liquid level sensing tube is sealed relative to the surrounding interior of the tank. A float may surround the liquid level sensing tube. The float may be magnetized. The float may magnetically interact with a member movable within the tube to in turn provide indication of the liquid level.

In one basic example of such a liquid level sensing system, the liquid level sensing fitting, in turn, has a removable cap or plug providing access to the upper end of the tube. A magnetic weight at the end of a measuring tape, string, or other device, may be located in the tube. The magnetic weight will interact with the float to be held at the same level as the float and thus at the level of the surface of liquid in the tank. This allows the level of the surface of liquid in the tank to be measured relative to the liquid level sensing fitting and thus relative to any other reference on the tank. Such measurements are typically taken periodically manually by a person assigned to the task. In one example where the weight and measuring tape are already in the tube, the end of the tape opposite the weight may be connected to the removable cap or plug. The user may open the cap or plug and pull to take up slack in the measuring tape. The user may take a reading with the tape to determine the liquid level of the tank.

Yet more complex systems are automated with the magnetic weight permanently within the tube and its vertical position electronically measured. Yet other systems involve capacitive measurements between inner and outer tubes. However, such systems are often costly, inaccurate, subject to separate maintenance, or require some manual measurement and are thus time-consuming and prone to human error.

SUMMARY

One aspect of the disclosure involves a fire suppressant storage device comprising: a tank having a first port, a second port, and an interior for storing fire suppressant. A discharge assembly is mounted to the first port and comprises a discharge valve and a discharge conduit at least partially within the interior. The discharge conduit has an interior and an exterior. A liquid level measurement assembly is mounted to the second port and comprises: a tube at least partially within the tank interior and having an interior sealed relative to the surrounding tank interior and an exterior; a float surrounding the tube; and a member axially movable within the tube interior. One of the float and the member comprises an upper magnet and a lower magnet. The other of the float and the member magnetically cooperates with the upper magnet and the lower magnet to relatively axially trap the member to the float.

In one or more embodiments of any of the foregoing embodiments, the upper magnet and the lower magnet are polarized in the same direction.

In one or more embodiments of any of the foregoing embodiments, the same direction is a radial direction or the same direction is an axial direction.

In one or more embodiments of any of the foregoing embodiments, said one of the float and the member is the float; and said other of the float and the member is the member.

In one or more embodiments of any of the foregoing embodiments, the member has a magnet polarized antiparallel to the upper magnet and the lower magnet.

In one or more embodiments of any of the foregoing embodiments, the upper magnet and the lower magnet are each a circumferential array of magnets.

In one or more embodiments of any of the foregoing embodiments, the liquid level measurement assembly further comprises means for measuring an axial position of the member.

In one or more embodiments of any of the foregoing embodiments, the means for measuring an axial position of the member comprises a longitudinal array of magnetic field sensors or magnetic switches.

In one or more embodiments of any of the foregoing embodiments, the means for measuring an axial position of the member is selected from the group consisting of: a tensioned element passing through an aperture in the member and means for measuring a vibratory frequency of the tensioned element; a tensioned element passing through an aperture in the member and means for measuring an electrical resistance of the tensioned element; an optical position sensor; and an ultrasonic position sensor.

In one or more embodiments of any of the foregoing embodiments, the fire suppressant storage device further comprises said fire suppressant within the tank interior, the discharge conduit at least partially immersed in the fire suppressant.

In one or more embodiments of any of the foregoing embodiments, said fire suppressant comprises a clean agent.

In one or more embodiments of any of the foregoing embodiments, the fire suppressant storage device further comprises a compressed gas propellant in a headspace of the tank.

In one or more embodiments of any of the foregoing embodiments, a method for using the fire suppressant storage device comprises measuring a position of the member along the tube.

In one or more embodiments of any of the foregoing embodiments, the method further comprises: discharging the suppressant from the tank; and during the discharging, repeating the measuring one or more times.

In one or more embodiments of any of the foregoing embodiments, a method for manufacturing the fire suppressant storage device involves the liquid level measurement assembly being a second liquid level measurement assembly. The method comprises removing a first liquid level measurement assembly from the second port. The first liquid level measurement assembly comprises a tube at least partially within the interior and having: an interior sealed relative to the surrounding tank interior; and an exterior. A float surrounds the tube and has one or more magnets at only a single axial position. The method further includes mounting the second liquid level measurement assembly to the second port, the float of the second liquid level measurement assembly comprising said upper magnet and said lower magnet.

Another aspect of the disclosure involves a fire suppressant storage device comprising: a tank having a first port, a second port, and an interior for storing fire suppressant. A discharge assembly is mounted to the first port and comprises: a discharge valve; and a discharge conduit at least partially within the interior. The discharge conduit has an interior and an exterior. A liquid level measurement assembly is mounted to the second port and comprises a tube at least partially within the interior and having: an interior sealed relative to the surrounding tank interior; and an exterior. A float surrounds the tube. A member is axially moveable within the tube interior. The liquid level measurement assembly comprises a longitudinal array of magnetic field sensors or magnetic switches within the tube; the member has an aperture surrounding the array. The member has one or more magnets positioned to magnetically cooperate with one or more of the magnetic field sensors or magnetic switches for determining a position of the member along the array and with the float to relatively axially trap the member to the float.

In one or more embodiments of any of the foregoing embodiments, said magnetic field sensors or magnetic switches are present as Hall Effect sensors or Hall Effect switches.

In one or more embodiments of any of the foregoing embodiments, said magnetic switches are present as reed switches.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
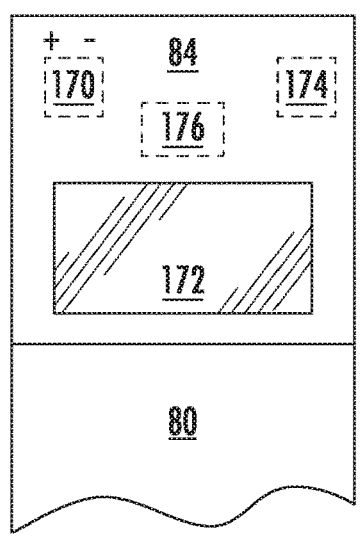
FIG. 1A is an enlarged partially schematic view of an electronics module of the fire suppressant storage device.
Figure 1:
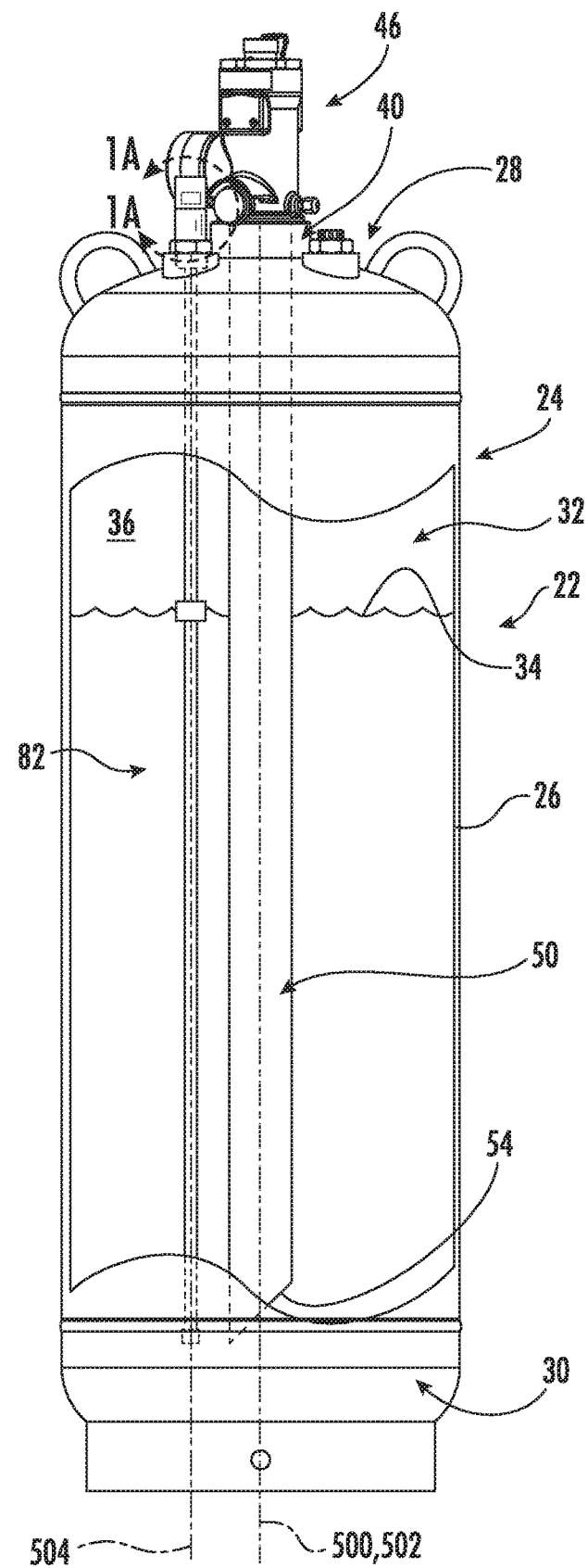
FIG. 1 is a partially cutaway view of a fire suppressant storage device.

FIG. 1 shows a fire suppression storage device 20 including a tank 22. The exemplary tank 22 has a body 24 including a cylindrical centerbody section 26 defining a central longitudinal axis 500. In an exemplary installation situation, the axis 500 is vertical. The tank 22 has respective upper and lower domed end portions 28 and 30. Exemplary tank materials are metal (e.g., steel or aluminum alloy) and the tank may represent any of numerous existing or yet-developed tank configurations. The tank has an interior 32 which, in pre-discharge condition, contains a body of liquid suppressant (agent) shown having a surface 34 leaving a headspace 36 thereabove to contain compressed gas pressurant/propellant. The upper end portion 28 bears a center port surrounded by a fitting 40 (e.g., internally threaded or externally threaded). The exemplary internally threaded fitting 40 receives a lower externally threaded portion 42 (FIG. 2) of a body 44 of a discharge valve assembly 46 having a discharge valve 48.

Exemplary suppressants are HFCs or non HFC agents such as FK-5-1-12 mentioned above. Suppressants may broadly include "clean agents" and aqueous agents. A "clean agent" is defined as an "electrically nonconductive, volatile, or gaseous fire extinguishant that does not leave a residue upon evaporation." National Fire Protection Association (NFPA) Standard for Clean Agent Fire Extinguishing Systems—NFPA 2001.

Further "clean agents" include halocarbons (haloalkanes, haloketones, haloacids and the like) and their blends. Specific examples include fuoroform (HFC-23), bromotrifluoromethane (Freon 13B1), trifluoroiodomethane (Freon 13T1), pentafluoroethane (HFC-125), 1,1,1,2,3,3,3-heptafluoropropane (HFC-227ea), and the like. Exemplary pressurant/propellant is $N_2$, argon (Ar), carbon dioxide ($CO_2$), or blends.

Figure 2:
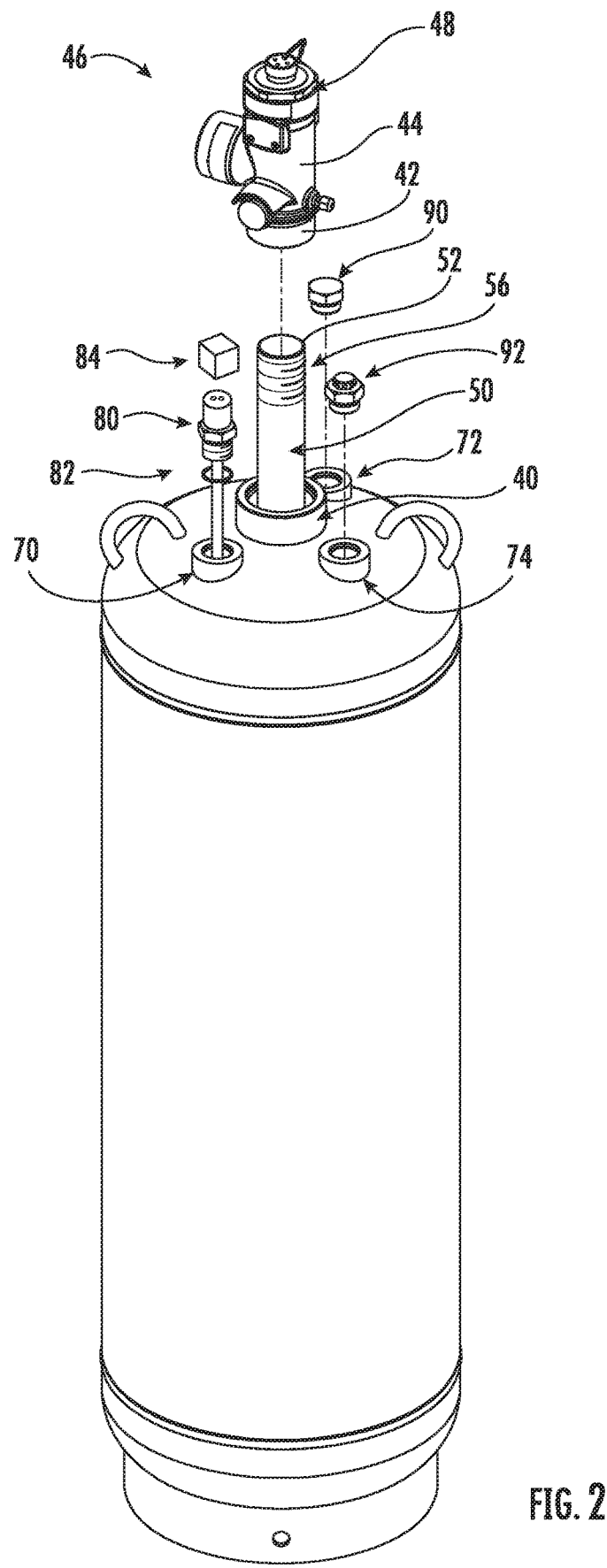
FIG. 2 is a partially exploded view of the device of FIG. 1

As shown in FIG. 2, the discharge valve assembly 46 combines with a discharge conduit (e.g., a metal tube) 50 to form a discharge assembly. The exemplary discharge conduit 50 extends from an upper end 52 (FIG. 2) to a lower end 54 (FIG. 1). An exemplary portion 56 adjacent the upper end 52 is externally threaded and received in an internally threaded bore of the discharge valve body lower portion 42. In operation, the lower end 54 is well below the liquid surface 34 (FIG. 1) so that pressure in the headspace 36 will drive suppressant upward through the discharge tube if the discharge valve is open. In the exemplary installed condition, the discharge conduit axis 502 is coincident with the tank axis 500.

As so far described, the fire suppressant storage device is representative of one exemplary configuration of many existing or yet-developed configurations to which the following teachings may apply.

FIG. 2 shows three off-axis ports 70, 72, and 74. All are internally threaded. In an exemplary implementation of a retrofit from a system having a top access plug of a prior art liquid level sensing tube assembly mounted to the port 70, the port 70 may instead include a connector plug 80 of a retrofit liquid level measurement assembly 82 (shown as a replacement liquid level sensing tube assembly in FIGS. 1-3 modified from a tape measure type baseline liquid level measurement assembly (not shown)).

Figure 3:
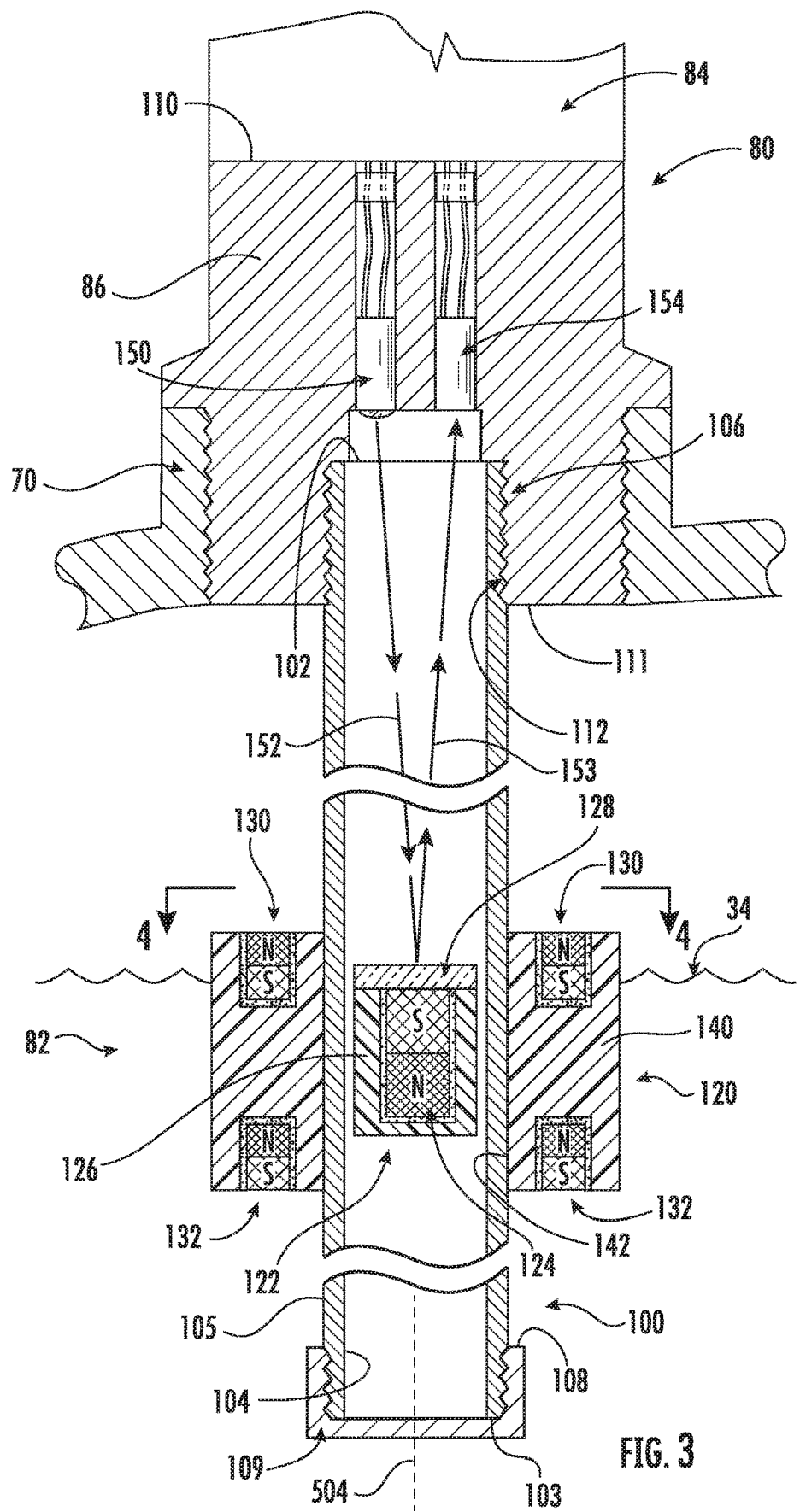
FIG. 3 is a central longitudinal cutaway view of a liquid level measurement assembly of the device of FIG. 1.

As illustrated in FIGS. 1A, 2, and 3, the connector plug 80 has upper contacts (FIG. 2) for mating with an electronics module 84. Alternative configurations may have a plug (not shown) mating with the connector plug 80 and connected via wires to a more remote electronics module (e.g., mounted to the discharge valve body).

FIG. 2 also shows respective plugs 90 and 92 with the ports 72 and 74. These might respectively be re-fill ports, overpressure devices such as rupture disks or relief valves, auxiliary pressure gauges, and the like. In alternative situations where an external pressurant/propellant is used (e.g., an external $N_2$ "driver" tank), one of the ports may couple to the driver tank or the driver tank may couple to the valve assembly.

FIG. 3 shows the liquid level measurement assembly 82 as including a tube 100 depending from a lower end of a body 86 of the connector plug 80. The exemplary connector plug body 86 and tube 100 are metallic (e.g., stainless steel). The exemplary tube 100 extends along a central longitudinal axis 504 shared with the port 70 and the port's fitting body (when assembled/installed) from an upper end 102 to a lower end 103 and has an inner diameter (ID) surface 104 and an outer diameter (OD) surface 105.

The exemplary plug body 86 has an upper end 110 and a lower end 111. The exemplary tube 100 is mounted to the plug via an externally threaded upper portion 106 mated to an internally threaded lower bore 112 in a lower portion of the plug body 86. The lower portion has an externally threaded outer diameter (OD) surface threaded to the internal thread of the fitting of the port 70.

The tube lower end 103 is closed (e.g., plugged or capped) to isolate the interior of the tube from the liquid agent. The tube is surrounded by a float 120 that moves up and down with the liquid agent surface 34. A center member 122 is within the tube interior and magnetically coupled to the float 120 to move therewith even though the tube interior contains only gas or is under vacuum.

Figure 4:
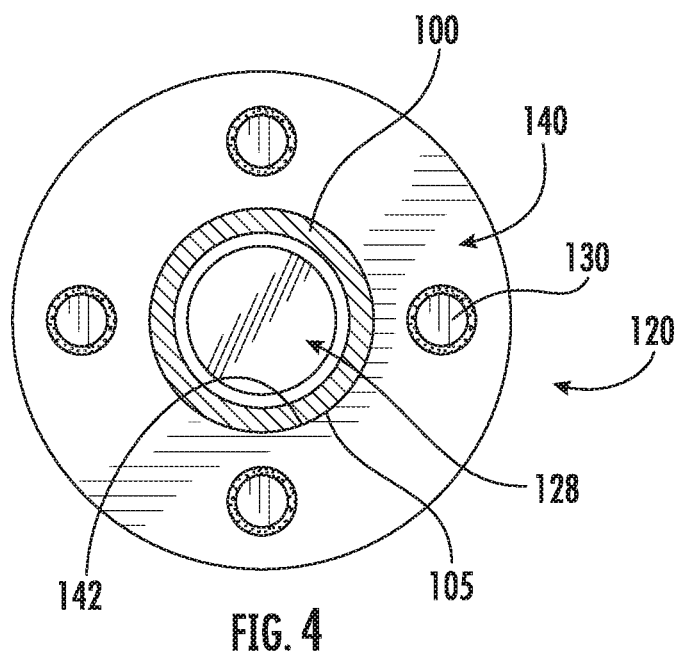
FIG. 4 is a transverse sectional view of the liquid level measurement assembly of FIG. 3.

As is discussed further below, the exemplary float 120 has one or more upper magnets 130 and one or more lower magnets 132. The upper and lower magnet(s) may each form a continuous or segmented annulus or a circumferential array. FIG. 3 thus represents both a central longitudinal sectional view through a float having annular magnets and a central longitudinal view through a float having circumferential arrays of magnets (with the cut plane intersecting diametrically opposed magnets such as cylindrical magnets). FIG. 4 shows exemplary circumferential arrays having four evenly-spaced magnets (with upper magnets 130 shown in the FIG. 4 top view of the float and the associated FIG. 3 lower magnets 132 hidden respectively directly below the upper magnets). The upper and lower magnets are respectively mounted in upper and lower compartments in a buoyant body 140 (e.g., molded plastic having one or more closed voids (not shown) for increased buoyancy).

The body 140 has a central vertical/longitudinal passageway surrounded by an inner diameter (ID) surface 142 in a smooth sliding relationship with the tube OD surface 105. A range of such sliding motion along the tube may be bounded by a stop 108 near the tube lower end (e.g., a sidewall rim of a cap 109 that closes the lower end or a ring (not shown) welded to the tube OD surface).

The exemplary magnets 130 and 132 (FIG. 3) are axially polarized in the same direction (north-upward in the illustrated example). The exemplary center member 122 is also formed as a magnet or includes a magnet (center magnet 124). The exemplary center magnet is a single axially polarized magnet polarized in the opposite direction as the magnets 130 and 132. The effect of this polarization is to allow the magnets of the float to support the weight of the center member with the center magnet 124 of the center member 122 trapped axially at a level between the upper magnets 130 and lower magnets 132.

Manufacturing tolerances, at least, will cause departures from pure axial polarity alignment (and thus from the degree of parallelity or anti-parallelity of the various magnets). Radial polarizations (discussed below) are also subject to such tolerances. In general, references to "opposition" comprehend sufficient closeness to true anti-parallel to achieve the same qualitative effect even if at different quantitative effect. Similarly, references to the same direction comprehend sufficient closeness to true parallel to achieve the same qualitative effect even if at different quantitative effect. References to axial and radial polarizations and to polarization alignment, without further modifier, also comprehend such a range of departure from exact axial, exact radial, and exact alignment. As alternative quantitative characterizations of axial and radial, departures of up to 30° are contemplated.

The center member 122 may also include a lightweight body 126 (FIG. 2—e.g., molded plastic) to hold the magnet 124 and adapt the magnet 124 to the size of the tube ID surface 104 with a smooth sliding relationship.

The opposite axial polarization of the center magnet 124 relative to the float magnets 130, 132 provides axial and radial centering/trapping. In the illustrated exemplary polarity, an upward displacement of the center magnet 124 relative to the float magnets 130, 132 causes the south poles to be closer and the north poles to be farther apart. The result is an increase in the S-S repulsive force between the center magnet 124 and the upper float magnet(s) 130 (a repulsive force acting to drive the center magnet downward relative to the float magnet(s)) 130, 132 while decreasing the N-N repulsive force between the center magnet and the lower float magnet(s) 132 (a repulsive force acting to drive the center magnet upward relative to the float magnet(s)). The result is that the relative axial displacement produces a corrective net axial force.

A radial displacement (e.g., a shift of the center magnet 124 to the right in FIG. 3) causes an increase in the S-S and N-N radial repulsive force between the center magnet 124 and the float magnets 130 and 132 at the right (or portions of single upper and lower annular magnets to the right). Similarly, that radial displacement decreases the repulsive force between the center magnet 124 and the float magnets 130 and 132 at the left. Thus, there is also a corrective net radial force resulting from radial displacement.

Compared with a hypothetical float having only a single stage of magnets (instead of the illustrated two stages) and a single magnet on the center member polarized axially opposite (anti-parallel), at least some embodiments of the FIG. 3 configuration may be beneficial in that reliability and accuracy of the center member position may be improved. Specifically, the top magnets 130 may prevent the center member 122 from entrapment due to, for example, high friction between surfaces or due to dirt or debris accumulation. In that case, the gravity alone may not be sufficient to facilitate uninhibited downward movement of the center member if there was only one stage. In addition, top magnets within the float further may act to better center the center member axially and radially within the tube. This effect facilitates more repeatable placement and higher position accuracy. Moreover, with the top magnets, the center member position may be significantly more stable when perturbed by external forces due to for example vibrations, tipping over, and impact. These external forces act to remove the center member from the float magnetic trap. The trap may be much stronger with both bottom and top magnets present.

Compared with a hypothetical float having only a single stage of magnets and a single magnet on the center member polarized parallel, the FIG. 3 configuration may be similarly beneficial if not moreso. The parallel orientation is believed unstable compared to the anti-parallel orientation.

Figure 5:
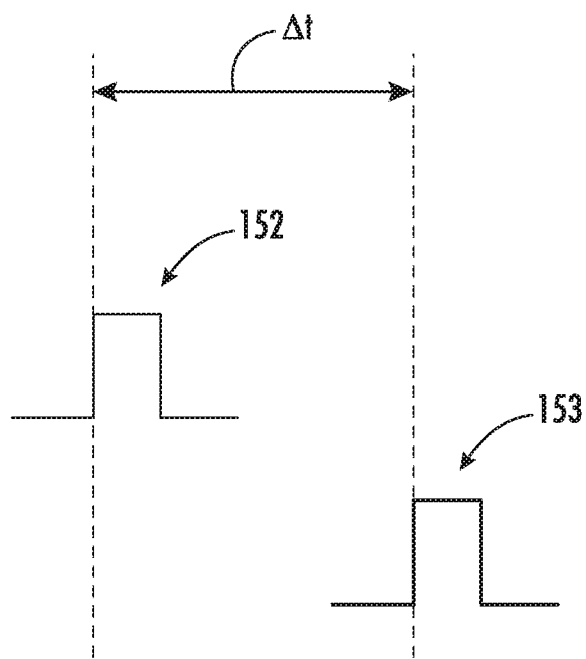
FIG. 5 is view of a pulse delay in the liquid level measurement assembly of FIG. 3.

As is discussed further below, any of numerous existing or yet-developed techniques may be used to measure the vertical position of the center member 122 and from that determine the liquid level. In the FIG. 3 example, a light or sound source 150 in the plug 80 may transmit a light or sound signal 152 that is reflected off the center member (e.g., off a reflector 128) as a return/reflected light or sound signal 153 and picked up by a light or sound sensor 154 in the plug. Via time of flight, the distance between the source 150 and sensor 154 on the one hand and center member 122 on the other hand may be determined. FIG. 5 shows a time delay Δt between an emitted pulse or signal 152 and a received return/reflected pulse 153. The time delay Δt is proportional to the distance. The electronics module 84 contains electronics for generating the emitted signal 152, receiving the reflected signal 153, taking the time difference Δt and multiplying this by a constant to determine the spacing. The delay Δt may be converted into a more direct expression of the fill level by the appropriate linear relationship between the two variables obtained from a calibration look-up table.

For light signals, an exemplary source 150 is a laser diode and an exemplary sensor is a photodiode. For sound, an exemplary source 150 is a piezoelectric element or speaker and an exemplary sensor is a capacitive pressure sensor or microphone. FIG. 4 further shows the exemplary reflector 128 at the top of the center member (e.g., formed as a mirror or polished metal plate for a light signal or a metal or plastic plate for a sound signal).

The module 84 (and the corresponding modules of further embodiments below) may have a power source such as a battery 170 (FIG. 1A) for powering the module and may have a display 172 (e.g., an LCD or LED) and/or a radio 174 (e.g., Bluetooth) in addition to circuitry for measuring level. The display may visually display a fill level and the radio (or alternative link (e.g., infrared, optical, or hardwiring)) may communicate the fill level to further control equipment (not shown).

Figure 6:
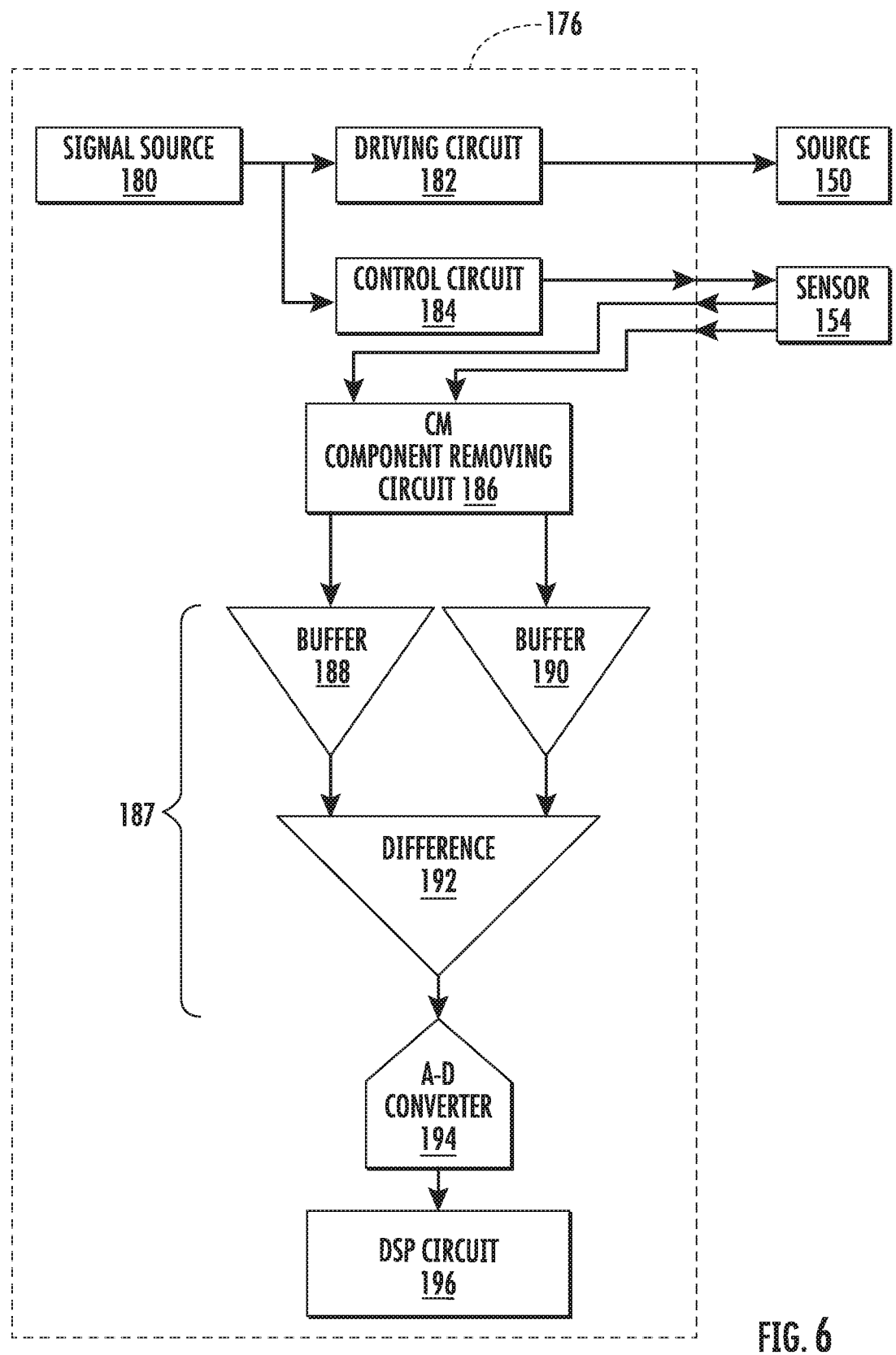
FIG. 6 is a schematic of a liquid level measurement circuit in the electronics module of FIG. 1A.

FIG. 6 is a schematic of a level measurement circuit 176 within the electronics module 84. The circuit includes a signal source 180 feeding both a driving circuit 182 (driving unit) of the light source 150 and a control circuit 184 (control unit) feeding the sensor 154. A CM (Common Mode) component removing circuit 186 receives sensor output. A distance measurement value acquiring circuit 187 (distance measurement value acquiring unit) includes buffers 188, 190, which in turn feed a difference detection circuit 192 whose output passes through an AD converter circuit 194, to a digital signal processing (DSP) circuit 196.

An alternative circuitry for the electronics module is a time of flight (ToF) circuit with laser diode emitter and phase-change based DSP. One example is reflected in the VL53L0X Time-of-Flight Distance Sensor Carrier with Voltage Regulator of Solarbotics Ltd., Calgary, Alberta, Canada.

Figure 7:
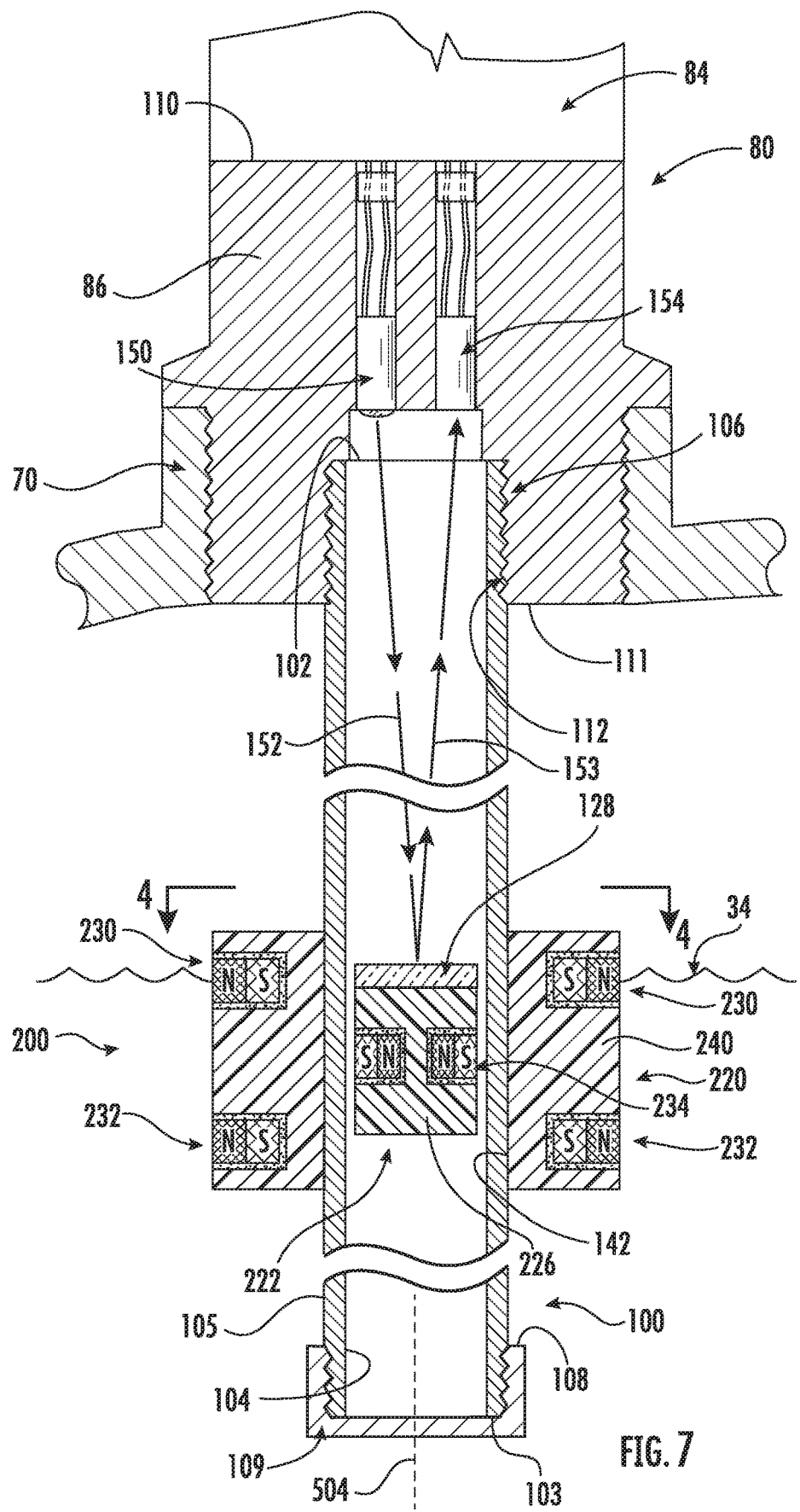
FIG. 7 is a central longitudinal cutaway view of an alternative second liquid level measurement assembly of the device of FIG. 1.
Figure 8:
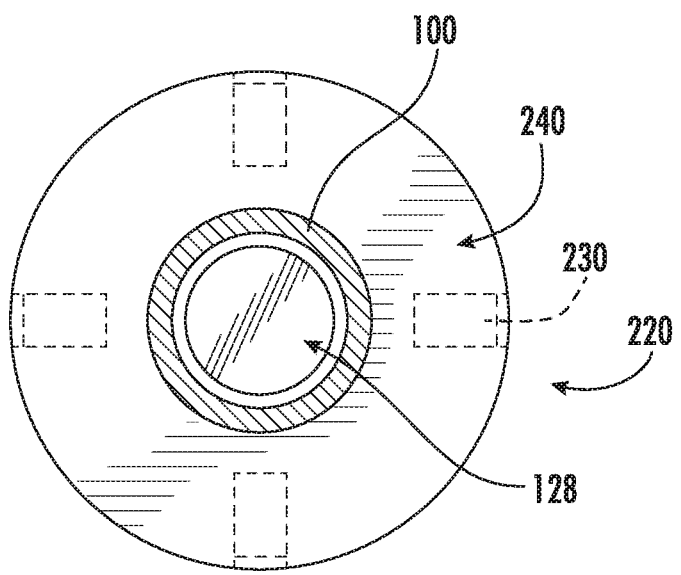
FIG. 8 is a transverse sectional view of the second liquid level measurement assembly.

FIGS. 7 and 8 show an alternative second liquid level measurement assembly 200 that is otherwise similar to the first liquid level measurement assembly 82 except that the magnets 230, 232, 234 are radially polarized instead of axially polarized. The exemplary float magnets 230, 232 may be formed in respective upper and lower circumferential arrays of radially-polarized magnets (e.g., of cylindrical magnets with radial axes inserted in a body 240 of the float 220). The center magnet 234 may thus be formed as a radially-polarized annulus (e.g., overmolded by a plastic body 226 of the center member 222) or as a circumferential array of radially-polarized magnets (e.g., inserted in a body 226 of the center member 222). In the illustrated example, the center magnet polarity is south-outward and the float magnet polarity is south-inward. In that situation, the south pole repulsive interactions dominate the axial and radial corrective forces because the north poles are farther away from each other than are the south poles.

Compared with a hypothetical float having only a single stage of radially polarized magnets and a single magnet on the center member polarized radially opposite (anti-parallel), at least some embodiments of the FIG. 7 configuration may be beneficial in that reliability and accuracy of the center member position may be improved. Specifically, top magnets 230 may prevent the center member from entrapment due to for example high friction between surfaces or due to dirt or debris accumulation. In that case, the gravity alone may not be sufficient to facilitate uninhibited downward movement of the center member. In addition, top magnets within the float may further act to better center the center member 222 axially and radially within the tube. This effect facilitates more repeatable placement and higher position accuracy. Moreover, with the top magnets, the center member position may be significantly more stable when perturbed by external forces due to for example vibrations, tipping over, and impact. These external forces act to remove the center member from the float magnetic trap. The trap may be much stronger with both bottom and top magnets present.

A further alternative (not shown) radially polarizes the center magnet and axially polarizes the upper and lower float magnets opposite to each other. If the center magnet is polarized south-outward (radially) and the float magnet polarity is south-inward (axially—i.e., the upper float magnet polarity is south-downward and the lower float magnet polarity is south-upward), the respective south poles will be closer than the respective north poles. Thus, the south pole repulsive interactions dominate and produce axial and radial corrective forces. A hybrid of that unillustrated configuration and the FIG. 7 configuration could rotate the float magnet polarities to an angle within the 90° between those two.

Similar effects may be achieved by reversing which of the float and center member has two axially-spaced magnets or groups and which only has one relative to the examples above (and further examples below). However, because it is desirable to minimize the weight of the center member, this may be less favored.

Figure 9:
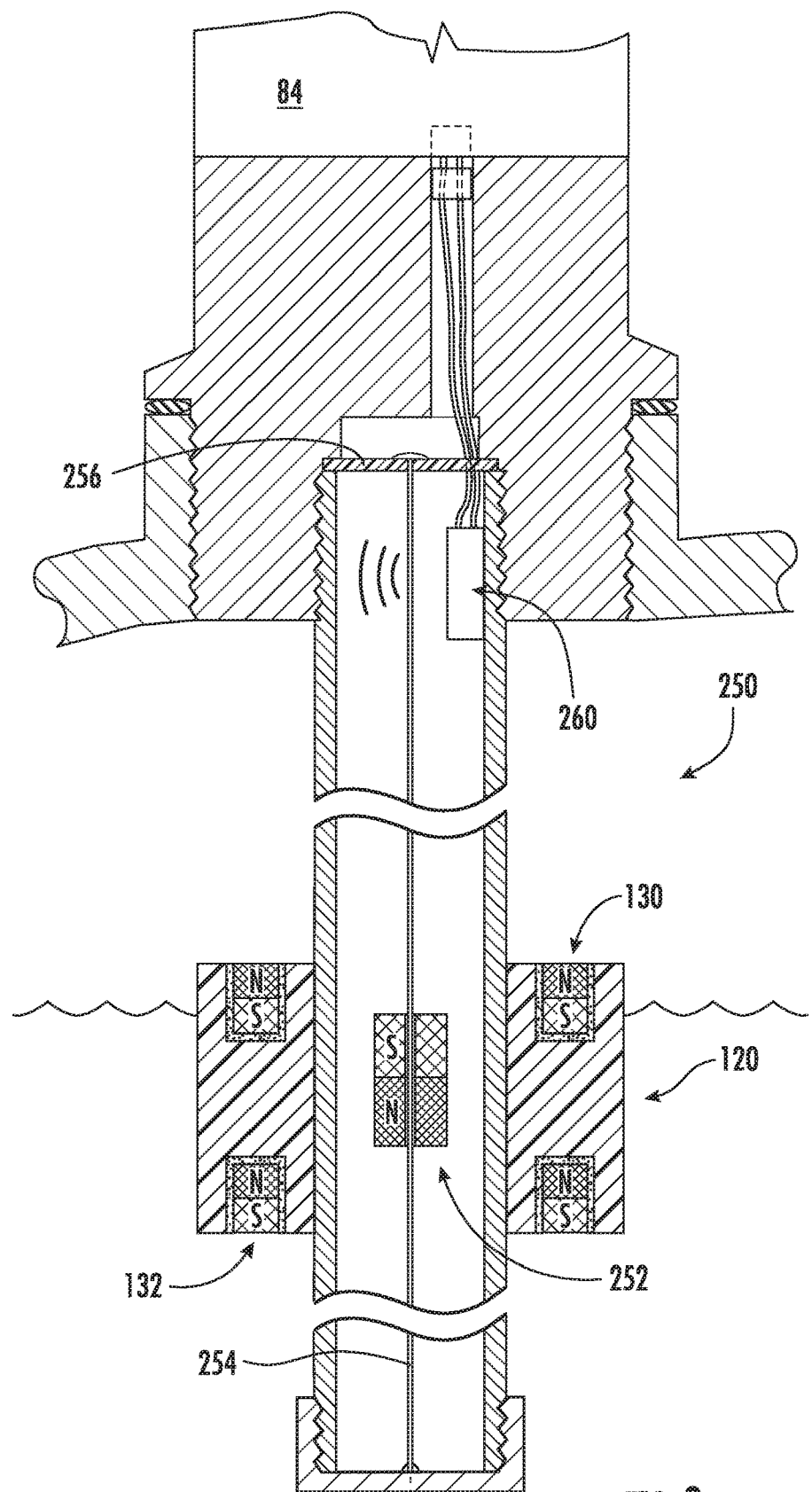
FIG. 9 is a central longitudinal cutaway view of an alternative third liquid level measurement assembly of the device of FIG. 1.

FIG. 9 shows an alternative third liquid level measurement assembly 250 that is generally similar to the first liquid level measurement assembly but using a vibratory measurement technique. The center magnet 252 forms a centerbody and slides along a central wire 254 (or other tensioned member such as a polymer filament or bundle) passing through a central aperture in the center magnet. The wire may be pretensioned between upper and lower ends of the tube (e.g., between a spider or other cross-member 256 secured at the top (e.g., welded) and the lower end plug or cap). Ambient energy/vibrations in most industrial/commercial/residential situations will be enough to excite resonant modes of the wire. The vertical position of the center magnet influences resonant behavior of the wire (e.g., the frequencies at which certain modes are excited). Measurement of the resonant behavior may thus measure center magnet 252 and float 120 position and thus liquid level. An example involves a vibration sensor 260 positioned near the top of the tube. An exemplary sensor 260 may be constructed as a non-contact capacitive or eddy current sensor. The exemplary sensor 260 may function by measuring changes in capacitance or electromagnetic field associated with changes in the proximity of the metallic wire due to the ambient excitations. The electronics module 84 may be pre-programmed with one or more maps of frequency shift vs. height of the float (or directly to fill level). Height (or proxy such as percentage of position along the tube) may in turn be mapped to fill level (percent full or specific mass or volume of suppressant).

Variations on the third liquid level measurement assembly may include radially-polarized variants like FIG. 7 is a variation on FIG. 3.

Figure 10:
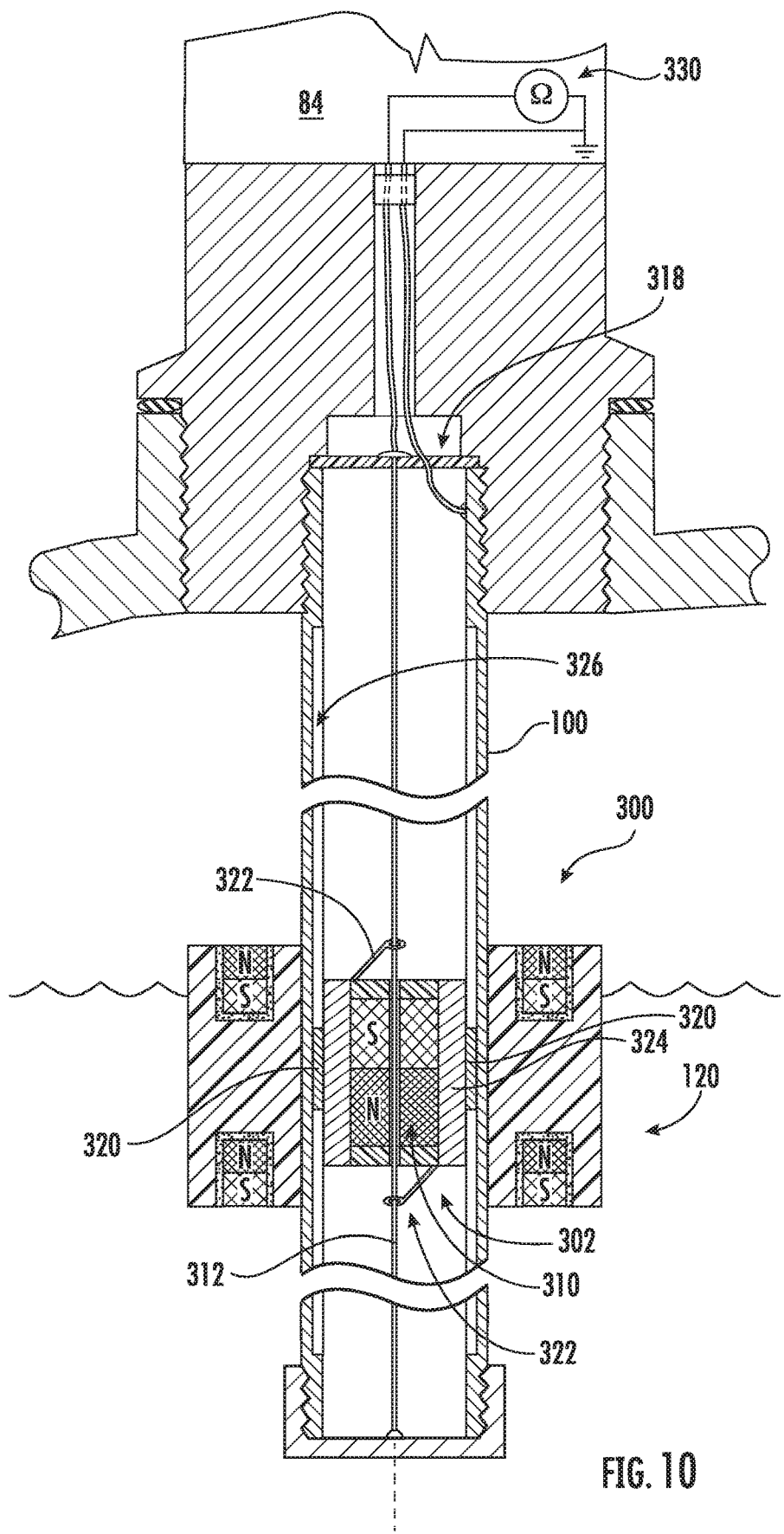
FIG. 10 is a central longitudinal cutaway view of an alternative fourth liquid level measurement assembly of the device of FIG. 1.

FIG. 10 shows an alternative fourth liquid level measurement assembly 300 that is generally similar to the first liquid level measurement assembly but using a resistive measurement technique. The center member 302 has a center magnet 310 that slides along a central wire 312 passing through a central aperture in the center magnet. The wire has upper mounting electrically insulated from the tube (e.g., plastic or other non-metallic cross-member 318 atop or pressed into the tube). The center member 302 has means for placing the wire in electrical contact with the tube. Exemplary means include one or more metallic contacts 320 engaging the tube ID surface and one or more metallic contacts 322 engaging the wire. In one example, the contact(s) 320 are mounted to the outer diameter (OD) surface of sleeve 324 (e.g., copper alloy) surrounding the magnet 310 and the contacts 322 are wires extending from ends of the sleeve. The contacts 320 may be accommodated in axial grooves 326 in the ID surface of the tube to maintain good electrical contact while the sleeve maintains the axial orientation of the magnet to prevent binding. The electronics module 84 may contain an ohmmeter 330 measuring resistance between the upper end of the tube and the upper end of the wire.

The vertical position of the center member 302 determines the length of the portions of tube 100 and wire 312 above the center member. The higher the center member, the lower the lengths, and thus the lower the resistance measured by the ohmmeter.

Further variations on the first, second, third, and fourth liquid level measurement assemblies include using a center member that is not itself a magnet but which still magnetically interacts with the float to move with the float. For example, a steel center member.

Figure 11:
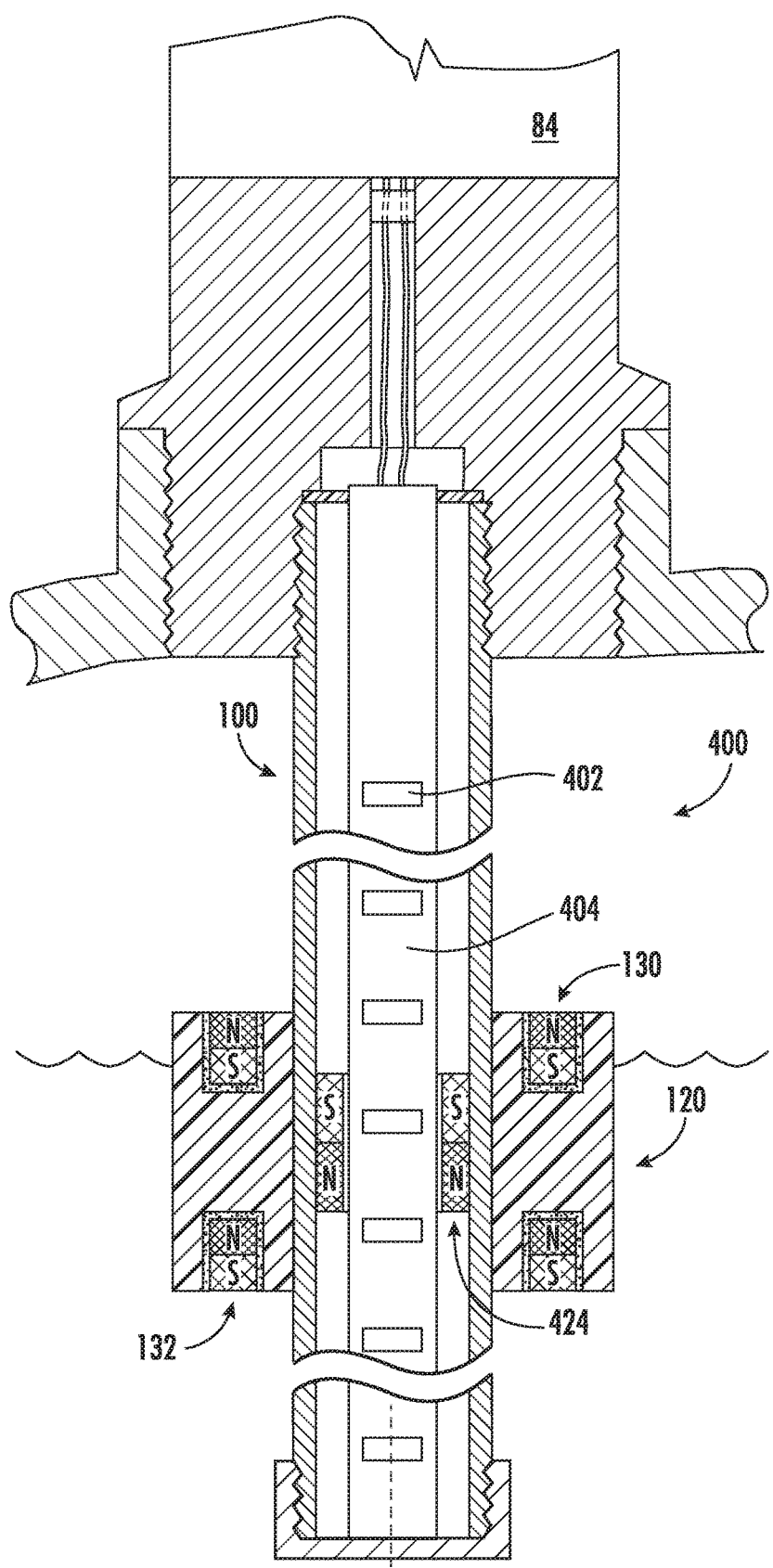
FIG. 11 is a central longitudinal cutaway view of an alternative fifth liquid level measurement assembly of the device of FIG. 1.

FIG. 11 shows an alternative fifth liquid level measurement assembly 400 that is generally similar to the first liquid level measurement assembly but using a vertical array of magnetic sensors or switches 402. The sensors or switches are mounted on a carrier 404 (e.g., a printed circuit board) passing through a central aperture in the center magnet 424. The relatively close proximity of the center magnet exposes the sensors or switches to greater magnetic field than would equivalent magnets on the float. This allows for greater sensitivity relative to a system without an inner member. The exemplary axially polarized annular magnet 424 forms the centerbody. Alternate centerbodies may have further components.

Figure 12:
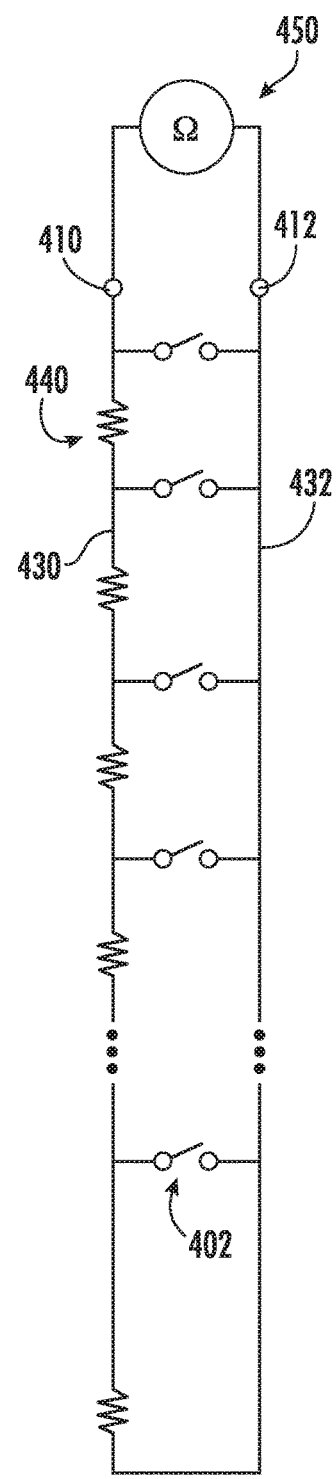
FIG. 12 is a schematic of a switch circuit in the liquid level measurement assembly of FIG. 11.

FIG. 12 shows an exemplary circuit formed along the carrier 404. Conductors (e.g., traces) 430 and 432 and connecting leads respectively extend from terminals 410 and 412 (e.g., in the plug). The switches 402 are connected between the traces 430 and 432 at even intervals. Along one of the traces, a series of resistors 440 are provided between adjacent switches. When the center magnet 424 is adjacent one of the switches, that switch will close and the cumulative resistance of the resistors above the switch will provide the resistance between the terminals 410 and 412. Thus, the electronics module may contain an ohmmeter 450 that applies a simple DC or AC current between the terminals and measures the resistance. The measured resistance may be converted to a more direct representation of fill level by means of a lookup table correlating the series resistance of sequentially closed switches with position of the switches on the printed circuit board.

As noted above, the center magnet 424 may expose the sensors or switches 402 to a higher magnetic field than would be obtained from the float magnets alone. This allows some embodiments using the center magnet 424 to have one or more of several advantages over certain alternatives. It may allow use of less expensive magnets. It may allow use of smaller magnets on the float (e.g., thereby allowing a smaller float). It may allow use of less expensive and/or smaller and/or less sensitive switches or sensors. It may allow enhanced resolution.

When Hall Effect sensors 402 are used instead of switches, instead of the resistive ladder of FIG. 12, the sensors may be connected to a microcontroller in the electronics module having one or more calibration look-up tables to better define position of the inner member with respect to the activated sensors. The microcontroller, for example could activate specific Hall sensors one-by-one to determine between which two Hall sensors the magnetic member is positioned (i.e., the two sensors producing the highest signal magnitudes). The microcontroller then would compare signals from these two neighboring Hall sensors with the calibration look-up table to determine the exact float position with better accuracy. A first lookup table correlates the relative signal between any two adjacent sensors with a percentage of distance between the two sensors. A second lookup table could correlate specific sensor locations with specific fill levels. The microcontroller than uses the results of the first lookup table to modify the result of the second. For example if the first lookup table shows the level is ¾ from the $6^{th}$ sensor to the $7^{th}$ (counting from the bottom), and the second lookup table correlates the $6^{th}$ sensor height to 50% full and the $7^{th}$ to 60% full, the microcontroller can calculate the tank to be 57.5% full.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A method for manufacturing a fire suppressant storage device, the fire suppressant storage device (20) comprising:
    a tank (22) having a first port (40), a second port (70), and an interior (32) for storing fire suppressant;
    a discharge assembly (46) mounted to the first port and comprising:
        a discharge valve (48); and
        a discharge conduit (50) at least partially within the interior and having:
            an interior; and
            an exterior; and
    a liquid level measurement assembly (82; 200; 250; 300; 400) mounted to the second port and comprising:
        a tube (100) at least partially within the tank interior and having:
            an interior sealed relative to the surrounding tank interior; and
            an exterior;
        a float (120; 220) surrounding the tube; and
        a member (122; 222; 252; 302) axially movable within the tube interior,
    wherein:
        the liquid level measurement assembly is a second liquid level measurement assembly;
        one of the float and the member comprises an upper magnet (130; 230) and a lower magnet (132; 232); and
        the other of the float and the member magnetically cooperates with the upper magnet and the lower magnet to relatively axially trap the member to the float,
    the method comprising:
        removing a first liquid level measurement assembly from the second port, the first liquid level measurement assembly comprising:
            a tube at least partially within the interior and having:
                an interior sealed relative to the surrounding tank interior; and
                an exterior;
            a float surrounding the tube and having one or more magnets at only a single axial position; and
        mounting the second liquid level measurement assembly to the second port, the float of the second liquid level measurement assembly comprising said upper magnet and said lower magnet.

2. The method of claim 1 wherein:
    the upper magnet and the lower magnet are polarized in the same direction.

3. The method of claim 2 wherein:
    the same direction is a radial direction.

4. The method of claim 2 wherein:
    the same direction is an axial direction.

5. The method of claim 1 wherein:
    said one of the float and the member is the float; and
    said other of the float and the member is the member.

6. The method of claim 1 wherein:
    the member has a magnet (134; 234; 252; 310; 424) polarized anti-parallel to the upper magnet and the lower magnet.

7. The method of claim 1 wherein:
    the upper magnet and the lower magnet are each a circumferential array of magnets.

8. The method of claim 1 wherein the liquid level measurement assembly further comprises:
    means for measuring an axial position of the member.

9. The method of claim 8 wherein the means for measuring an axial position of the member is selected from the group consisting of:
    a tensioned element (254) passing through an aperture in the member and means (260) for measuring a vibratory frequency of the tensioned element;
    a tensioned element (312) passing through an aperture in the member and means (330) for measuring an electrical resistance of the tensioned element;
    an optical position sensor (154); and
    an ultrasonic position sensor (154).

10. A fire suppressant storage device (20) comprising:
    a tank (22) having a first port (40), a second port (70), and an interior (32) for storing fire suppressant;

a discharge assembly (46) mounted to the first port and comprising:
  a discharge valve (48); and
  a discharge conduit (50) at least partially within the interior and having:
    an interior; and
    an exterior; and
a liquid level measurement assembly (400) mounted to the second port and comprising:
  a tube (100) at least partially within the interior and having:
    an interior sealed relative to the surrounding tank interior; and
    an exterior;
  a float (120) surrounding the tube; and
  a member (424) axially moveable within the tube interior,
wherein:
  the liquid level measurement assembly comprises a longitudinal array of magnetic field sensors or magnetic switches (402) within the tube;
  the member has an aperture surrounding the array; and
  the member has one or more magnets positioned to magnetically cooperate with one or more of the magnetic field sensors or magnetic switches for determining a position of the member along the array and with the float to relatively axially trap the member to the float.

11. The fire suppressant storage device of claim 10 further comprising:
  said fire suppressant within the tank interior, the discharge conduit at least partially immersed in the fire suppressant.

12. The fire suppressant storage device of claim 11 wherein:
  said fire suppressant comprises a clean agent.

13. The fire suppressant storage device of claim 11 further comprising:
  a compressed gas propellant in a headspace of the tank.

14. A method for using the fire suppressant storage device of claim 10 the method comprising:
  measuring a position of the member along the tube.

15. The method of claim 14 further comprising:
  discharging the suppressant from the tank; and
  during the discharging, repeating the measuring one or more times.

16. The fire suppressant storage device of claim 10 wherein:
  said magnetic field sensors or magnetic switches are present as Hall Effect sensors or Hall Effect switches.

17. The fire suppressant storage device of claim 10 wherein:
  said magnetic switches are present as reed switches.

18. The fire suppressant storage device of claim 10 wherein:
  said float comprises an upper magnet and a lower magnet.

19. The fire suppressant storage device of claim 18 wherein:
  said member one or more magnets is an axially polarized annular magnet.

20. The fire suppressant storage device of claim 19 wherein:
  the upper magnet and the lower magnet are polarized in the same axial direction.

* * * * *